US012652516B2

(12) United States Patent (10) Patent No.: US 12,652,516 B2

Chen et al. (45) Date of Patent: Jun. 9, 2026

(54) MULTI-DEVICE JOINT CALL METHOD AND APPARATUS

(71) Applicant: Yinwang Intelligent Technologies Co., Ltd., Shenzhen (CN)

(72) Inventors: Yao Chen, Beijing (CN); Mingchao Li, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 269 days.

(21) Appl. No.: 18/456,050

(22) Filed: Aug. 25, 2023

(65) Prior Publication Data

US 2023/0413028 A1 Dec. 21, 2023

Related U.S. Application Data

(63) Continuation of application No. PCT/CN2022/077016, filed on Feb. 21, 2022.

(30) Foreign Application Priority Data

Feb. 26, 2021 (CN) .......................... 202110214857.3

(51) Int. Cl.
*H04W 4/90* (2018.01)
*H04W 68/02* (2009.01)
*H04W 76/14* (2018.01)

(52) U.S. Cl.
CPC ............. *H04W 4/90* (2018.02); *H04W 68/02* (2013.01); *H04W 76/14* (2018.02)

(58) Field of Classification Search
CPC ....... H04W 4/90; H04W 68/02; H04W 76/14; H04W 12/06; H04W 4/44; H04W 4/48;
(Continued)

(56) References Cited

U.S. PATENT DOCUMENTS

2004/0142678 A1* 7/2004 Krasner ............... G08B 25/016
455/345
2010/0178935 A1* 7/2010 Jang ........................ H04W 4/02
455/458
(Continued)

FOREIGN PATENT DOCUMENTS

CN 104247549 A 12/2014
CN 105532025 A 4/2016
(Continued)

OTHER PUBLICATIONS

International Search Report and Written Opinion in International Appln. No. PCT/CN2022/077016, mailed on May 7, 2022, 23 pages (with English translation).
(Continued)

*Primary Examiner* — Hirdepal Singh

(74) *Attorney, Agent, or Firm* — Fish & Richardson P.C.

(57) ABSTRACT

In one of the various implementations of this disclosure, a first device establishes short-range communication with a second device. The first device obtains related information of the second device based on the short-range communication. The first device sends the related information of the second device and related information of the first device to a third device. The first device then receives paging from the third device, where the paging is sent by the third device based on the related information of the second device and the related information of the first device.

16 Claims, 8 Drawing Sheets

(58) Field of Classification Search
 CPC .. H04W 4/80; G08G 1/205; H04M 2203/658;
   H04M 2242/04; H04M 2250/02; H04M
     3/58
 USPC ...................................................... 455/404.2
 See application file for complete search history.

(56) References Cited

U.S. PATENT DOCUMENTS

| | | | |
|---|---|---|---|
| 2010/0227582 A1 | 9/2010 | Berry et al. | |
| 2012/0220258 A1 | 8/2012 | Hatton | |
| 2014/0294180 A1* | 10/2014 | Link, II ................. | G08G 1/205 |
| | | | 380/270 |
| 2015/0187146 A1* | 7/2015 | Chen ........................ | G07C 5/02 |
| | | | 701/31.5 |
| 2015/0342542 A1* | 12/2015 | An .................... | H04M 1/72421 |
| | | | 600/549 |
| 2017/0374538 A1* | 12/2017 | Gellens ................... | H04W 4/48 |

FOREIGN PATENT DOCUMENTS

| | | | | | |
|---|---|---|---|---|---|
| CN | 112715033 | A | 4/2021 | | |
| CN | 110771111 | B | 6/2021 | | |
| EP | 2953106 | A1 | 12/2015 | | |
| WO | WO-2017079977 | A1 * | 5/2017 | ........... | H04W 76/10 |
| WO | 2018157531 | A1 | 9/2018 | | |

OTHER PUBLICATIONS

Extended European Search Report in European Appln No. 22758826.
6, dated Jul. 5, 2024, 9 pages.

* cited by examiner

MULTI-DEVICE JOINT CALL METHOD AND APPARATUS

CROSS-REFERENCE TO RELATED APPLICATIONS

This application is a continuation of International Application No. PCT/CN2022/077016, filed on Feb. 21, 2022, which claims priority to Chinese Patent Application No. 202110214857.3, filed on Feb. 26, 2021. The disclosures of the aforementioned applications are hereby incorporated by reference in their entireties.

TECHNICAL FIELD

This application relates to the field of intelligent driving technologies, and in particular, to a multi-device joint call method and apparatus.

BACKGROUND

When a vehicle collides, to enable a user in the vehicle to be rescued in a timely manner, the user may implement an emergency call through a terminal device. For example, based on an advanced mobile location (AML) integrated on the terminal device, when the user makes the emergency call in a case of enabling the AML, in one aspect, the terminal device establishes a voice call to an alarm platform, and in another aspect, the terminal device automatically collects location information and reports information such as the location information, a mobile phone number, or a called number to a rescue platform. Therefore, the rescue platform may send the obtained information to the alarm platform, and then the alarm platform may perform rescue based on the received information.

However, a manner of implementing the emergency call through the terminal device is limited. For example, when power of the terminal device is insufficient, an information reporting process may be interrupted, and consequently, the rescue platform cannot obtain accurate location information. Alternatively, when the terminal device is damaged to a specific extent, the terminal device cannot support implementation of an effective emergency call, and consequently cannot report the location information to the rescue platform.

SUMMARY

Embodiments of this application provide a multi-device joint call method and apparatus, used in the field of intelligent driving technologies. The method includes: A first device establishes short-range communication with a second device. The first device obtains related information of the second device based on the short-range communication. The first device sends the related information of the second device and related information of the first device to a third device. The first device receives paging from the third device, where the paging is sent by the third device based on the related information of the second device and the related information of the first device. In this way, when power of the second device is insufficient, an exception occurs, or the like, the second device may reliably send emergency information through the first device, so that the third device sends the paging to the first device by parsing the related information of the second device and the related information of the first device, and may obtain rescue-related information, to dispatch personnel to perform rescue.

According to a first aspect, an embodiment of this application provides a multi-device joint call method. The method includes: A first device establishes short-range communication with a second device. The first device obtains related information of the second device based on the short-range communication. The first device sends the related information of the second device and related information of the first device to a third device. The first device receives paging from the third device, where the paging is sent by the third device based on the related information of the second device and the related information of the first device. In this way, when power of the second device is insufficient, an exception occurs, or the like, the second device may reliably send emergency information through the first device, so that the third device sends the paging to the first device by parsing the related information of the second device and the related information of the first device, and may obtain rescue-related information, to dispatch personnel to perform rescue.

In a possible implementation, that a first device establishes short-range communication with a second device includes: The first device receives a connection establishment request from the second device. The first device authenticates an identity of the second device based on the connection establishment request and first subscription information, where the first subscription information indicates at least one assisted device allowing the first device to assist in calling the third device. The first device establishes the short-range communication with the second device when the identity of the second device is successfully authenticated. In this way, the first device may obtain the related information of the second device based on the short-range communication.

In a possible implementation, the connection establishment request includes a request reason, the first subscription information further includes a condition under which the first device allows establishment of the short-range communication, and that the first device authenticates an identity of the second device based on the connection establishment request and first subscription information includes: When the request reason matches the condition and the at least one assisted device includes the second device, the identity of the second device is successfully authenticated. In this way, the first device may correctly establish, based on the received request reason, the short-range communication with the first device that sends the request reason.

In a possible implementation, the request reason includes at least one of the following: the second device detects a collision event, the second device detects a rescue event, power of the second device is insufficient, or the second device is the assisted device.

In a possible implementation, the paging is paging for a voice call, and the method further includes: The first device automatically enables answering based on the paging.

In a possible implementation, the answering is hands-free answering. In this way, a user may report a situation around the user through a voice call based on the hands-free answering, to improve rescue efficiency.

In a possible implementation, before the first device establishes the short-range communication with the second device, the method further includes: The first device receives a short-range communication function enabling indication from the third device. The first device enables a short-range communication function of the first device based on the short-range communication function enabling indication. In this way, when the short-range communication function is not enabled, the first device may enable the short-range communication function based on the short-range communication function enabling indication.

In a possible implementation, the related information of the first device includes one or more of the following: location information of the first device, time stamp information related to the first device, contact information of the first device, an identification number of the first device, or track information of the first device; or the related information of the second device includes one or more of the following: location information of the second device, time stamp information related to the second device, contact information of the second device, an identification number of the second device, track information of the second device, or a reason why the second device is assisted in calling the third device.

According to a second aspect, an embodiment of this application provides a multi-device joint call method. The method includes: A third device receives a paging request message from a first device, where the paging request message includes related information of the first device and related information of a second device. The third device sends paging to the first device based on the paging request message. In this way, the third device may learn of a situation around the first device through paging, and may implement emergency rescue based on received information.

In a possible implementation, that the third device sends paging to the first device based on the paging request message includes: The third device sends the paging to the first device when there is no response to paging sent by the third device to the second device. In this way, the third device may learn of the situation around the first device through the first device, thereby improving rescue efficiency.

In a possible implementation, before that the third device sends paging to the first device based on the paging request message, the method further includes: The third device receives a short-range communication request from the second device. The third device authenticates an identity of the first device based on the short-range communication request and second subscription information, where the second subscription information indicates at least one assisting device that is allowed to assist the second device in calling the third device. When the identity of the first device is successfully authenticated, the third device sends a short-range communication function enabling indication to the first device. In this way, when the first device does not enable a short-range communication function, the third device may indicate the first device to enable the short-range communication function.

In a possible implementation, that the third device authenticates an identity of the first device based on the short-range communication request and subscription information includes: When the first device is the assisting device, the identity of the first device is successfully authenticated. In this way, the third device may correctly send the short-range communication function enabling indication to the second device.

In a possible implementation, the related information of the first device includes one or more of the following: location information of the first device, time stamp information related to the first device, contact information of the first device, an identification number of the first device, or track information of the first device; or the related information of the second device includes one or more of the following: location information of the second device, time stamp information related to the second device, contact information of the second device, an identification number of the second device, track information of the second device, or a reason why the second device is assisted in calling the third device.

In a possible implementation, the paging is paging for a voice call.

According to a third aspect, an embodiment of this application provides a multi-device joint call method. The method includes: A second device sends a connection establishment request to a first device. The second device establishes short-range communication with the first device based on the connection establishment request. The second device sends related information of the second device to the first device based on the short-range communication.

The connection establishment request includes a request reason, and the request reason includes at least one of the following: the second device detects a collision event, the second device detects a rescue event, power of the second device is insufficient, or the second device is an assisted device.

In a possible implementation, before that a second device sends a connection establishment request to a first device, the method further includes: The second device sends a short-range communication request to a third device.

In a possible implementation, the related information of the second device includes one or more of the following: location information of the second device, time stamp information related to the second device, contact information of the second device, an identification number of the second device, track information of the second device, or a reason why the second device is assisted in calling the third device.

In a possible implementation, that a second device sends a connection establishment request to a first device includes: The second device automatically triggers, based on a preset condition, sending of the connection establishment request.

According to a fourth aspect, an embodiment of this application provides a multi-device joint call apparatus. The multi-device joint call apparatus may be a first device, or may be a component, a chip, or a chip system in the first device. The multi-device joint call apparatus may include a processing unit and a communication unit. When the multi-device joint call apparatus is a first device, the processing unit may be a processor, and the communication unit may be a communication interface or an interface circuit. The multi-device joint call apparatus may further include a storage unit, and the storage unit may be a memory. The storage unit is configured to store instructions, and the processing unit executes the instructions stored in the storage unit, so that the first device implements the multi-device joint call method according to any one of the first aspect or the possible implementations of the first aspect. When the multi-device joint call apparatus is a component, a chip, or a chip system in the first device, the processing unit may be a processor, and the communication unit may be a communication interface. For example, the communication interface may be an input/output interface, a pin, or a circuit. The processing unit executes the instructions stored in the storage unit, so that the first device implements the multi-device joint call method according to any one of the first aspect or the possible implementations of the first aspect. The storage unit may be a storage unit (for example, a register or a cache) in the chip, or may be a storage unit (for example, a read-only memory or a random access memory) that is in the first device and that is located outside the chip.

For example, the processing unit is configured to establish short-range communication with a second device. The communication unit is configured to obtain related information of the second device based on the short-range communication. The communication unit is configured to send the related information of the second device and related information of the first device to a third device. The communication unit is configured to receive paging from the third device, where the paging is sent by the third device based on the related information of the second device and the related information of the first device.

In a possible implementation, the communication unit is specifically configured to receive a connection establishment request from the second device. The processing unit is specifically configured to authenticate an identity of the second device based on the connection establishment request and first subscription information, where the first subscription information indicates at least one assisted device allowing the first device to assist in calling the third device. The processing unit is specifically configured to establish the short-range communication with the second device when the identity of the second device is successfully authenticated.

In a possible implementation, the connection establishment request includes a request reason, and the first subscription information further includes a condition under which the first device allows establishment of the short-range communication. The processing unit is specifically configured to: when the request reason matches the condition and the at least one assisted device includes the second device, successfully authenticate the identity of the second device.

In a possible implementation, the request reason includes at least one of the following: the second device detects a collision event, the second device detects a rescue event, power of the second device is insufficient, or the second device is the assisted device.

In a possible implementation, the paging is paging for a voice call, and the processing unit is specifically configured to automatically enable answering based on the paging.

In a possible implementation, the answering is hands-free answering.

In a possible implementation, the communication unit is further configured to receive a short-range communication function enabling indication from the third device; and the processing unit is further configured to enable a short-range communication function of the first device based on the short-range communication function enabling indication.

In a possible implementation, the related information of the first device includes one or more of the following: location information of the first device, time stamp information related to the first device, contact information of the first device, an identification number of the first device, or track information of the first device; or the related information of the second device includes one or more of the following: location information of the second device, time stamp information related to the second device, contact information of the second device, an identification number of the second device, track information of the second device, or a reason why the second device is assisted in calling the third device.

According to a fifth aspect, an embodiment of this application provides a multi-device joint call apparatus. The multi-device joint call apparatus may be a third device, or may be a component, a chip, or a chip system in the third device. The multi-device joint call apparatus may include a processing unit and a communication unit, and the communication unit may be understood as a receiving unit and a sending unit. When the multi-device joint call apparatus is a third device, the processing unit may be a processor, and the communication unit may be a communication interface or an interface circuit. The multi-device joint call apparatus may further include a storage unit, and the storage unit may be a memory. The storage unit is configured to store instructions, and the processing unit executes the instructions stored in the storage unit, so that the third device implements the multi-device joint call method according to any one of the second aspect or the possible implementations of the second aspect. When the multi-device joint call apparatus is a component, a chip, or a chip system in the third device, the processing unit may be a processor, and the communication unit may be a communication interface. For example, the communication interface may be an input/output interface, a pin, or a circuit. The processing unit executes the instructions stored in the storage unit, so that the third device implements the multi-device joint call method according to any one of the second aspect or the possible implementations of the second aspect. The storage unit may be a storage unit (for example, a register or a cache) in the chip, or may be a storage unit (for example, a read-only memory or a random access memory) that is in the third device and that is located outside the chip.

For example, the receiving unit is configured to receive a paging request message from a first device, where the paging request message includes related information of the first device and related information of a second device; and the sending unit is configured to send paging to the first device based on the paging request message.

In a possible implementation, the sending unit is specifically configured to send the paging to the first device when there is no response to paging sent by the sending unit to the second device.

In a possible implementation, the receiving unit is further configured to receive a short-range communication request from the second device. The processing unit is configured to authenticate an identity of the first device based on the short-range communication request and second subscription information, where the second subscription information indicates at least one assisting device that is allowed to assist the second device in calling the third device. The sending unit is specifically configured to: when the identity of the first device is successfully authenticated, send a short-range communication function enabling indication to the first device.

In a possible implementation, the processing unit is specifically configured to: when the first device is the assisting device, successfully authenticate the identity of the first device.

In a possible implementation, the related information of the first device includes one or more of the following: location information of the first device, time stamp information related to the first device, contact information of the first device, an identification number of the first device, or track information of the first device; or the related information of the second device includes one or more of the following: location information of the second device, time stamp information related to the second device, contact information of the second device, an identification number of the second device, track information of the second device, or a reason why the second device is assisted in calling the third device.

In a possible implementation, the paging is paging for a voice call.

According to a sixth aspect, an embodiment of this application provides a multi-device joint call apparatus. The multi-device joint call apparatus may be a second device, or may be a component, a chip, or a chip system in the second device. The multi-device joint call apparatus may include a processing unit and a communication unit. When the multi-device joint call apparatus is a second device, the processing unit may be a processor, and the communication unit may be a communication interface or an interface circuit. The multi-device joint call apparatus may further include a storage unit, and the storage unit may be a memory. The storage unit is configured to store instructions, and the processing unit executes the instructions stored in the storage unit, so that the second device implements the multi-device joint call method according to any one of the third aspect or the possible implementations of the third aspect. When the multi-device joint call apparatus is a component, a chip, or a chip system in the second device, the processing unit may be a processor, and the communication unit may be a communication interface. For example, the communication interface may be an input/output interface, a pin, or a circuit. The processing unit executes the instructions stored in the storage unit, so that the second device implements the multi-device joint call method according to any one of the third aspect or the possible implementations of the third aspect. The storage unit may be a storage unit (for example, a register or a cache) in the chip, or may be a storage unit (for example, a read-only memory or a random access memory) that is in the second device and that is located outside the chip.

For example, the communication unit is configured to send a connection establishment request to a first device. The processing unit is configured to establish short-range communication with the first device based on the connection establishment request. The communication unit is configured to send related information of the second device to the first device based on the short-range communication.

The connection establishment request includes a request reason, and the request reason includes at least one of the following: the second device detects a collision event, the second device detects a rescue event, power of the second device is insufficient, or the second device is an assisted device.

In a possible implementation, the communication unit is further configured to send a short-range communication request to a third device.

In a possible implementation, the related information of the second device includes one or more of the following: location information of the second device, time stamp information related to the second device, contact information of the second device, an identification number of the second device, track information of the second device, or a reason why the second device is assisted in calling the third device.

In a possible implementation, the communication unit is specifically configured to automatically trigger, based on a preset condition, sending of the connection establishment request.

According to a seventh aspect, an embodiment of this application provides a multi-device joint call apparatus. The apparatus includes a memory and a processor. The memory stores computer program instructions, and the processor runs the computer program instructions, to implement the multi-device joint call method according to any one of the implementations of the first aspect to the third aspect.

According to an eighth aspect, an embodiment of this application provides a computer-readable storage medium. The computer-readable storage medium stores a computer program or instructions. When the computer program or the instructions are run on a computer, the computer is enabled to perform the multi-device joint call method according to any one of the implementations of the first aspect to the third aspect.

According to a ninth aspect, an embodiment of this application provides a computer program product. When the computer program product runs on a processor, a multi-device joint call apparatus is enabled to perform the multi-device joint call method according to any one of the implementations of the first aspect to the third aspect.

According to a tenth aspect, an embodiment of this application provides a multi-device joint call system. The system includes any one or more of the following: the multi-device joint call apparatus according to the fourth aspect and the possible implementations of the fourth aspect, the multi-device joint call apparatus according to the fifth aspect and the possible implementations of the fifth aspect, or the multi-device joint call apparatus according to the sixth aspect and the possible implementations of the sixth aspect.

According to an eleventh aspect, this application provides a chip or a chip system. The chip or the chip system includes at least one processor and a communication interface. The communication interface and the at least one processor are interconnected through a line. The at least one processor is configured to run a computer program or instructions, to perform the multi-device joint call method according to any one of the implementations of the first aspect to the third aspect. The communication interface in the chip may be an input/output interface, a pin, a circuit, or the like.

In a possible implementation, the chip or the chip system described in this application further includes at least one memory, and the at least one memory stores instructions. The memory may be a storage unit in the chip, for example, a register or a cache, or may be a storage unit (for example, a read-only memory or a random access memory) of the chip.

It should be understood that the second aspect to the eleventh aspect of this application correspond to the technical solutions in the first aspect of this application, and beneficial effects achieved by the aspects and the corresponding feasible implementations are similar. Details are not described again.

DESCRIPTION OF EMBODIMENTS

To clearly describe the technical solutions in embodiments of this application, terms such as "first" and "second" are used in embodiments of this application to distinguish between same items or similar items that provide basically same functions or purposes. For example, a first chip and a second chip are merely used to distinguish between different chips, and a sequence of the first chip and the second chip is not limited. A person skilled in the art may understand that the terms such as "first" and "second" do not limit a quantity or an execution sequence, and the terms such as "first" and "second" do not indicate a definite difference.

It should be noted that, in embodiments of this application, the term such as "example" or "for example" is used to represent giving an example, an illustration, or descriptions. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

When a vehicle collides, to enable a user in the vehicle to be rescued in a timely manner, the user needs to initiate an emergency call. In this way, rescue personnel may rescue the user based on the initiated emergency call, to reduce a property loss and reduce casualties.

In a possible implementation, an emergency call may be implemented through a terminal device of a user in a vehicle. An advanced mobile location (AML) technology is integrated into an operating system of the terminal device. The AML technology is a location-based emergency positioning technology. In this way, time for determining a user location by a rescue platform can be shortened based on the AML technology, to shorten arrival time of the rescue personnel.

Figures 1, 2:
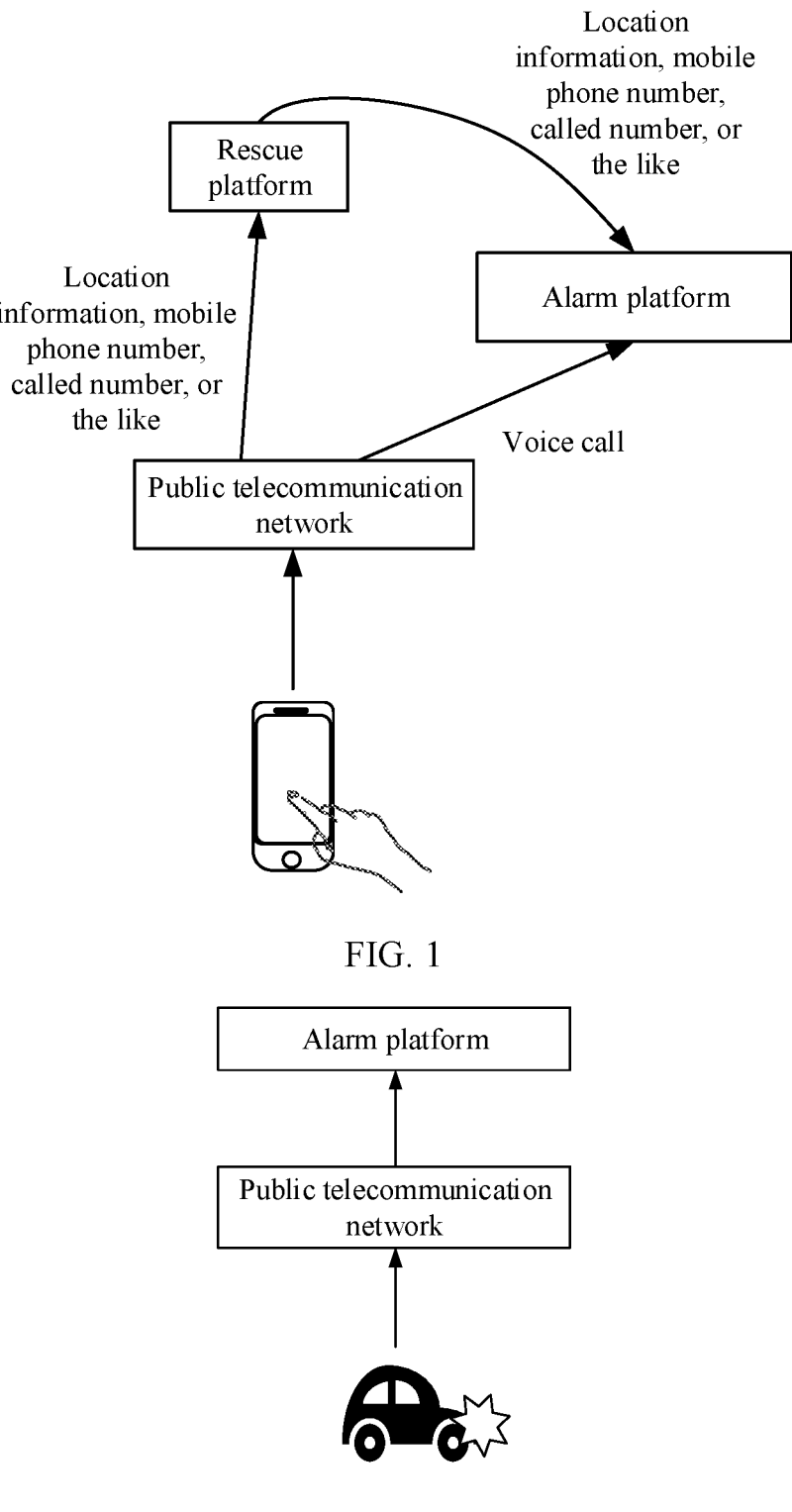
FIG. 1 is a schematic diagram of an emergency call manner in a conventional technology.
FIG. 2 is a schematic diagram of an emergency call manner in a conventional technology.

For example, FIG. 1 is a schematic diagram of an emergency call mode in a conventional technology. As shown in FIG. 1, in an AML-enabled state, when a user dials an emergency number, in one aspect, a terminal device establishes a voice call to an alarm platform through a public telecommunication network, and in another aspect, an operating system of the terminal device automatically collects location information of the terminal device, and automatically reports information such as the location information, a mobile phone number, or a called number to a rescue platform. Therefore, the rescue platform sends the obtained information to the alarm platform, and then the alarm platform may dispatch rescue personnel in a timely manner to perform rescue. The emergency number may include 110, 120, or the like. The alarm platform may include a 110 alarm platform, a 120 alarm platform, or the like. The rescue platform may include a public safety answering point (PSAP), or the like.

In another possible implementation, the emergency call may be implemented through an on-board emergency call (eCall) apparatus. The eCall apparatus may be pre-installed in a vehicle by a manufacturer, or may be installed in a vehicle by a user.

For example, FIG. 2 is a schematic diagram of an emergency call mode in a conventional technology. As shown in FIG. 2, when a traffic accident such as a collision occurs on a vehicle, an on-board eCall apparatus may automatically enable an in-band emergency call (in-band eCall) through a public telecommunication network, to establish a voice communication link from the vehicle to an alarm platform. The voice communication link is used to implement a voice call between the vehicle and the alarm platform. Because a minimum data set (MSD) such as location information and a vehicle identification number (VIN) is included in the voice call, rescue personnel may perform rescue in a timely manner based on the MSD. The alarm platform may include a 110 alarm platform, a 120 alarm platform, or the like.

However, a manner of implementing the emergency call through the terminal device may have the following problems: When power of the terminal device is insufficient, an information reporting process may be interrupted, and consequently, the rescue platform cannot obtain accurate location information. When the terminal device is damaged to a specific extent, the terminal device cannot support implementation of an effective emergency call, and consequently cannot report the location information to the rescue platform. Further, for a security risk existing in a shared travel such as a hitch ride, when an emergency call is implemented through a terminal device, if the terminal device is abandoned, the terminal device may fail to report correct location information to the rescue platform.

A manner of implementing the emergency call through the on-board eCall apparatus may have the following problems: When power of the on-board eCall apparatus is insufficient, an information reporting process may be interrupted, and consequently, the alarm platform cannot obtain accurate location information. When the on-board eCall apparatus is damaged to a specific extent, the on-board eCall apparatus cannot support implementation of an effective emergency call, and consequently cannot report the location information to the alarm platform.

Figures 3, 4:
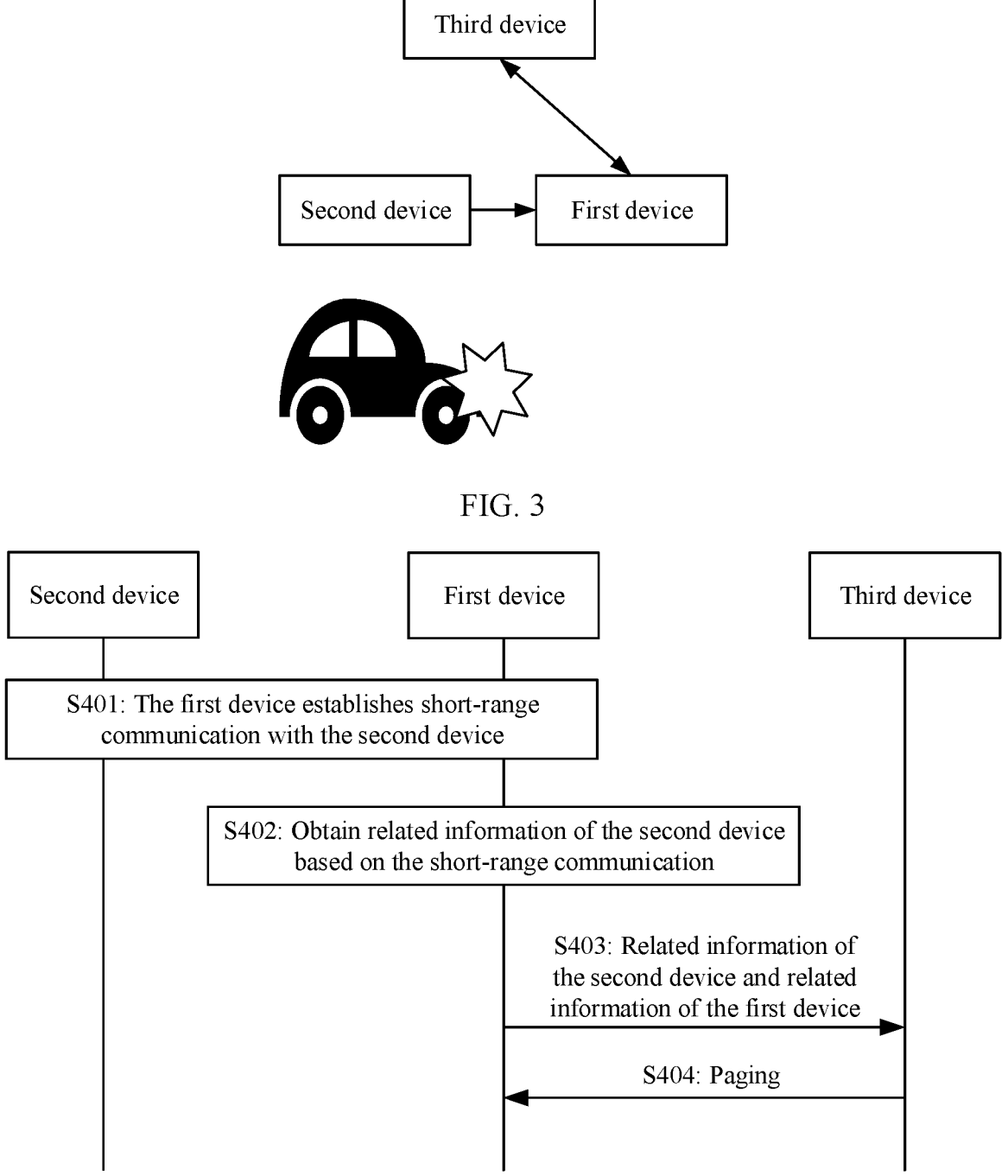
FIG. 3 is a schematic diagram of an emergency call scenario according to an embodiment of this application.
FIG. 4 is a schematic flowchart of a multi-device joint call method according to an embodiment of this application.

Based on this, embodiments of this application provide a multi-device joint call method. A first device may obtain related information of a second device through short-range communication with the second device, and send the related information of the second device and related information of the first device to a third device, so that the third device sends paging to the first device based on the obtained related information. In this way, when power of the second device is insufficient, an exception occurs, or the like, the second device may reliably send emergency information through the first device, so that the third device sends the paging to the first device by parsing the related information of the second device and the related information of the first device, and may obtain rescue-related information, to dispatch personnel to perform rescue. The method in embodiments of this application is used in an emergency call scenario. For example, FIG. 3 is a schematic diagram of an emergency call scenario according to an embodiment of this application. As shown in FIG. 3, the scenario includes a first device, a second device, and a third device. The first device may be a portable terminal device, an on-board device, or the like, the second device may be a portable terminal device, an on-board device, or the like, and the third device may be a device in a public safety answering point (PSAP). Specific content of the first device and the second device is related to a scenario in which an emergency call is implemented.

For example, in a scenario A, a traffic accident such as a collision occurs on a vehicle of a user. Because an on-board device has insufficient power or is damaged to a specific extent, and cannot support implementation of an effective emergency call, the emergency call may be implemented through a portable terminal device of the user. In the scenario A, the first device is the portable terminal device, and the second device is the on-board device. The portable terminal device may be a mobile phone, a smartwatch, or the like, and the on-board device may be an on-board terminal or the like. It may be understood that specific content of the portable terminal device and the on-board device may alternatively be set based on an actual application scenario. This is not limited in this embodiment of this application.

Scenario B: A user encounters a danger during driving, and a portable terminal device of the user has insufficient power, is restricted for use, or the like, and cannot support implementation of an effective emergency call. In this case, the emergency call may be implemented through an on-board device. In the scenario B, the first device is the on-board device, and the second device is the portable terminal device. For content of the on-board device and the portable terminal device, refer to the descriptions of the foregoing content. Details are not described herein again. It may be understood that specific content of the portable terminal device and the on-board device may alternatively be set based on an actual application scenario. This is not limited in this embodiment of this application.

With reference to the scenario A and the scenario B, when power of the second device is insufficient, an exception occurs, or the like, the first device may assist the second device in implementing the emergency call through paging between the first device and the third device.

When the second device needs to send information to the first device, the second device may send the information to the first device through a short-range communication link between the second device and the first device, so that the first device forwards, to the third device, the information received from the second device.

When the first device needs to send information to the third device, the first device sends, to the third device, information received from the second device and information about the first device, so that the third device sends paging to the first device based on the obtained message, to implement an emergency call.

It should be noted that the first device includes a communication module, a satellite positioning module, and the like, and the second device includes a communication module, a satellite positioning module, and the like. It may be understood that another module included in each of the first device and the second device may be set based on an actual application scenario. This is not limited in this embodiment of this application.

The communication module has a short-range communication function, and is used by the first device to establish short-range communication with the second device, so that the first device may receive related information of the second device from the second device through a short-range communication link; or is used by the second device to establish short-range communication with the first device, so that the second device may send related information of the second device to the first device through a short-range communication link.

The satellite positioning module has a positioning function, and may position the first device or the second device through a BeiDou satellite, a global positioning system (GPS), and/or the like.

For example, when a traffic accident such as a collision occurs on a vehicle, the satellite positioning module of the first device sends a location information request to the GPS, to trigger the GPS to obtain location information, so as to position the first device. It may be understood that a specific implementation in which the GPS obtains the location information is not limited in this embodiment of this application.

It should be noted that a process in which the satellite positioning module of the second device positions the second device is similar to a process in which the satellite positioning module of the first device positions the first device, and details are not described herein again. It may be understood that an implementation in which the satellite positioning module of the second device positions the second device may alternatively be set based on an actual application scenario. This is not limited in this embodiment of this application.

The following uses specific embodiments to describe in detail the technical solutions in embodiments of this application and how to resolve the foregoing technical problem according to the technical solutions in embodiments of this application. The following several specific embodiments may be implemented independently or combined with each other, and same or similar concepts or processes may not be repeatedly described in some embodiments.

For example, FIG. 4 is a schematic flowchart of a multi-device joint call method according to an embodiment of this application. As shown in FIG. 4, the method may include the following steps.

S401: A first device establishes short-range communication with a second device.

In this embodiment of this application, the short-range communication is for transmitting a message between the first device and the second device, to implement information sharing. A possible implementation in which the first device establishes the short-range communication with the second device is as follows: The first device establishes the short-range communication with the second device based on Bluetooth.

For example, when the first device and the second device enable Bluetooth, the first device searches for a device within a first range. After the second device is found, a personal identification number (PIN) related to the second device is input on the first device. When the PIN is correctly input, the first device is successfully connected to the second device, so that the first device establishes the short-range communication with the second device. The first range may be a range of 50 meters around the first device. It may be understood that specific content of the first range may alternatively be set based on an actual application scenario. This is not limited in this embodiment of this application. A specific implementation in which the first device establishes the short-range communication with the second device based on the Bluetooth is not limited in this embodiment of this application.

For example, when the foregoing scenario A is used as an example, the first device is a portable terminal device, and the second device is an on-board device. In this case, S401 may be described as follows: The portable terminal device establishes short-range communication with the on-board device. For an implementation in which the portable terminal device establishes the short-range communication with the on-board device, refer to the foregoing corresponding content descriptions, or the implementation may be set based on an actual application scenario. This is not limited in this embodiment of this application.

When the foregoing scenario B is used as an example, the first device is an on-board device, and the second device is a portable terminal device. In this case, S401 may be described as follows: The on-board device establishes short-range communication with the portable terminal device. For an implementation in which the on-board device establishes the short-range communication with the portable terminal device, refer to the foregoing corresponding content descriptions, or the implementation may be set based on an actual application scenario. This is not limited in this embodiment of this application.

S402: The first device obtains related information of the second device based on the short-range communication.

In this embodiment of this application, the second device may be a portable terminal device, an on-board device, or the like. Therefore, when there are different second devices, specific content of related information of the second devices is also different.

For example, in the foregoing scenario A, the second device is the on-board device, and the related information of the second device includes one or more of the following: location information of the second device, time stamp information related to the second device, an identification number of the second device, track information of the second device, or the like.

The location information of the second device indicates a location of the on-board device, and may include longitude, latitude, and the like of the on-board device. Alternatively, it may be understood as that the location information of the second device indicates a location of a user. In a possible manner, the location information of the second device includes longitude, latitude, and an elevation of the on-board device. The time stamp information related to the second device may include time at which the on-board device sends related information, and the like. The identification number of the second device may include a vehicle identification number (VIN), and the like. The VIN may include information such as a manufacturer, a year, a vehicle model, a vehicle body type, or an assembly location of a vehicle. The track information of the second device may include route information formed due to movement of the vehicle, and the like. It may be understood that, specific content of the related information of the second device may alternatively be set based on an actual application scenario. This is not limited in this embodiment of this application.

In the foregoing scenario B, the second device is the portable terminal device, and the related information of the second device includes one or more of the following: location information of the second device, time stamp information related to the second device, contact information of the second device, track information of the second device, a reason why the second device is assisted in calling a third device, or the like. It may be understood that, specific content of the related information of the second device may alternatively be set based on an actual application scenario. This is not limited in this embodiment of this application.

For content of the location information of the second device, the time stamp information related to the second device, or the track information of the second device, refer to the foregoing corresponding content descriptions. Details are not described herein again. The contact information of the second device may include a mobile phone number of the portable terminal device, information about contacts on the portable terminal device, information about a number dialed by a user through the portable terminal device, or the like. The reason why the second device is assisted in calling the third device indicates that the second device has an exception, and the reason may include that the second device detects a collision event, the second device detects a rescue event, or the like. It may be understood that, specific content of the related information of the second device may alternatively be set based on an actual application scenario. This is not limited in this embodiment of this application.

In a possible implementation, the related information of the second device may further include frequency indication information. In this way, after the first device obtains the related information of the second device, the first device may send information to the third device by using this frequency. For example, the frequency may be 10 hertz (Hz). It may be understood that a specific value of the frequency may alternatively be set based on an actual application scenario. This is not limited in this embodiment of this application.

In this embodiment of this application, implementations in which the first device obtains the related information of the second device based on the short-range communication may include the following several possible implementations.

In a first possible implementation, the first device periodically receives the related information of the second device from the second device based on the short-range communication.

For example, in a process in which the user drives a vehicle, the second device collects related information. Because the first device establishes the short-range communication with the second device, the second device may periodically send the related information of the second device to the first device through a short-range communication link. Periodic time may be 5 minutes. In this way, the second device may receive the related information of the second device from the second device every 5 minutes. It may be understood that a specific value of the periodic time may alternatively be set based on an actual application scenario. This is not limited in this embodiment of this application. A specific implementation in which the first device periodically receives the related information of the second device from the second device based on the short-range communication is not limited in this embodiment of this application.

In a second possible implementation, the first device receives the related information of the second device from the second device based on the short-range communication and a specific trigger condition.

For example, in a process in which the user drives a vehicle, the second device collects related information. If the trigger condition is that the vehicle collides, the second device sends the related information of the second device to the first device based on the short-range communication between the second device and the second device, so that the first device receives the related information of the second device from the second device. It may be understood that specific content of the trigger condition may alternatively be set based on an actual application scenario. This is not limited in this embodiment of this application.

For example, when the foregoing scenario A is used as an example, the first device is the portable terminal device, and the second device is the on-board device. In this case, S402 may be described as follows: The portable terminal device obtains related information of the on-board device based on the short-range communication. For an implementation in which the portable terminal device obtains the related information of the on-board device based on the short-range communication, refer to the foregoing corresponding content descriptions, or the implementation may be set based on an actual application scenario. This is not limited in this embodiment of this application.

When the foregoing scenario B is used as an example, the first device is the on-board device, and the second device is the portable terminal device. In this case, S402 may be described as follows: The on-board device obtains related information of the portable terminal device based on the short-range communication. For an implementation in which the on-board device obtains the related information of the portable terminal device based on the short-range communication, refer to the foregoing corresponding content descriptions, or the implementation may be set based on an actual application scenario. This is not limited in this embodiment of this application.

S403: The first device sends the related information of the second device and related information of the first device to the third device.

In this embodiment of this application, the first device may be a portable terminal device, an on-board device, or the like. Therefore, when there are different first devices, content of related information of the first devices is also different.

For example, in the foregoing scenario A, the first device is the portable terminal device, and content of the related information of the first device is similar to content of the related information used when the second device is the portable terminal device. Details are not described herein again. It may be understood that specific content of the related information of the first device may alternatively be set based on an actual application scenario. This is not limited in this embodiment of this application.

In the foregoing scenario B, the first device is the on-board device, and content of the related information of the first device is similar to content of the related information used when the second device is the on-board device. Details are not described herein again. In a possible implementation, the related information of the first device may further include contact information of the first device, and the contact information is the same as the contact information used when the second device is the portable terminal device. It may be understood that, specific content of the related information of the first device may alternatively be set based on an actual application scenario. This is not limited in this embodiment of this application.

Specifically, a possible implementation in which the first device sends the related information of the second device and the related information of the first device to the third device is as follows: The first device periodically sends the related information of the second device and the related information of the first device to the third device.

For example, the first device periodically receives the related information of the second device from the second device. Therefore, after receiving the related information of the second device and collecting the related information of the first device, the first device may also periodically send the related information of the second device and the related information of the first device to the third device. Periodic time may be 7 minutes. In this way, the third device may receive the related information of the second device and the related information of the first device from the first device every 7 minutes. It may be understood that a specific value of the periodic time may alternatively be set based on an actual application scenario. This is not limited in this embodiment of this application. A specific implementation in which the first device sends the related information of the second device and the related information of the first device to the third device is not limited in this embodiment of this application.

For example, when the foregoing scenario A is used as an example, the first device is the portable terminal device, the second device is the on-board device, and the third device is a PSAP. In this case, S403 may be described as follows: The portable terminal device sends the related information of the on-board device and related information of the portable terminal device to the PSAP. For an implementation in which the portable terminal device sends the related information of the on-board device and the related information of the portable terminal device to the PSAP, refer to the foregoing corresponding content descriptions, or the implementation may be set based on an actual application scenario. This is not limited in this embodiment of this application.

When the foregoing scenario B is used as an example, the first device is the on-board device, the second device is the portable terminal device, and the third device is a PSAP. In this case, S403 may be described as follows: The on-board device sends the related information of the portable terminal device and related information of the on-board device to the PSAP. For an implementation in which the on-board device sends the related information of the portable terminal device and the related information of the on-board device to the PSAP, refer to the foregoing corresponding content descriptions, or the implementation may be set based on an actual application scenario. This is not limited in this embodiment of this application.

S404: The first device receives paging from the third device.

In this embodiment of this application, the paging may include paging for a voice call and the like. The first device may automatically enable hands-free answering based on the paging, and enable collection of voice information in the vehicle, so that the first device may report a situation around the first device to the third device in a timely manner. It may be understood that specific content of the paging may alternatively be set based on an actual application scenario. This is not limited in this embodiment of this application.

In this embodiment of this application, the paging is sent by the third device based on the related information of the second device and the related information of the first device. Therefore, a possible implementation in which the first device receives the paging from the third device is as follows: The third device sends the paging to the first device based on the related information of the second device and the related information of the first device. Correspondingly, the first device receives the paging from the third device.

For example, after the third device receives the related information of the second device and the related information of the first device from the first device, the third device parses the related information of the first device and the related information of the second device. If the third device sends paging to the second device, but the second device does not respond to the paging, the third device may send the paging to the first device. Correspondingly, the first device receives the paging from the third device. It may be understood that a specific implementation in which the first device receives the paging from the third device is not limited in this embodiment of this application.

For example, after the third device receives the related information of the second device and the related information of the first device from the first device, the third device directly sends the paging to the first device by parsing the related information of the first device and the related information of the second device. Correspondingly, the first device receives the paging from the third device. It may be understood that a specific implementation in which the first device receives the paging from the third device may be set based on an actual application scenario. This is not limited in this embodiment of this application.

For example, when the foregoing scenario A is used as an example, the first device is the portable terminal device, and the third device is the PSAP. In this case, S404 may be described as follows: The portable terminal device receives paging from the PSAP. For an implementation in which the portable terminal device receives the paging from the PSAP, refer to the foregoing corresponding content descriptions, or the implementation may be set based on an actual application scenario. This is not limited in this embodiment of this application.

When the foregoing scenario B is used as an example, the first device is the on-board device, and the third device is the PSAP. In this case, S404 may be described as follows: The on-board device receives paging from the PSAP. For an implementation in which the on-board device receives the paging from the PSAP, refer to the foregoing corresponding content descriptions, or the implementation may be set based on an actual application scenario. This is not limited in this embodiment of this application.

In conclusion, in this embodiment of this application, the first device may forward the related information of the first device through the short-range communication with the second device, to reliably send emergency information, so that the third device sends the paging to the first device by parsing the related information of the second device and the related information of the first device, and may obtain rescue-related information, to dispatch personnel to perform rescue.

Figure 5:
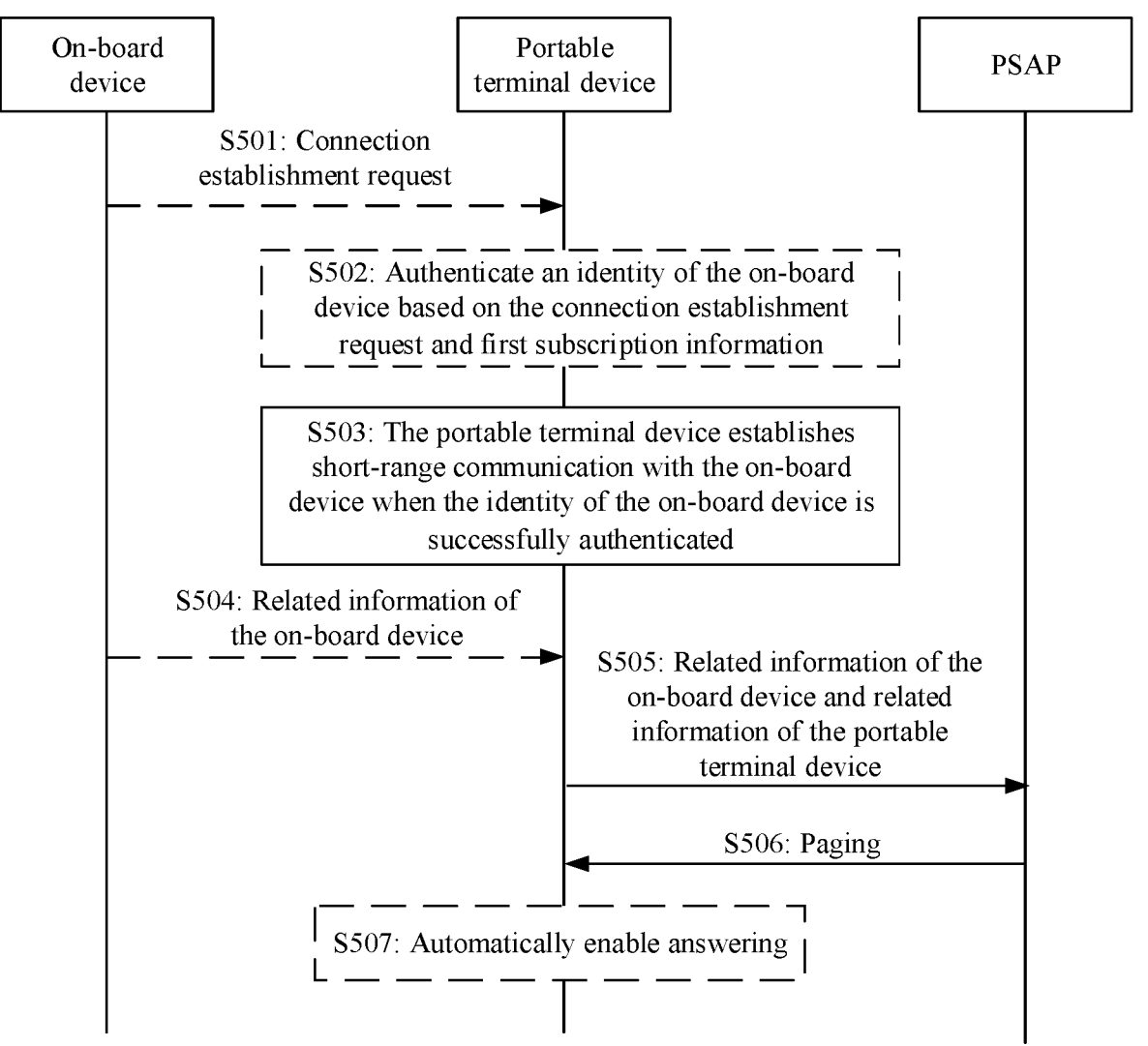
FIG. 5 is a schematic flowchart of a multi-device joint call method according to an embodiment of this application.

Based on the embodiment shown in FIG. 4, the foregoing scenario A is used as an example. For example, FIG. 5 is a schematic flowchart of a multi-device joint call method according to an embodiment of this application. In this embodiment of this application, a first device is a portable terminal device, a second device is an on-board device, and a third device is a PSAP. The portable terminal device may assist the on-board device in calling the PSAP, or it may be understood as that the on-board device may be assisted by the portable terminal device in calling the PSAP.

As shown in FIG. 5, the method may include the following steps.

S501: The on-board device sends a connection establishment request to the portable terminal device.

In this embodiment of this application, the connection establishment request includes a request reason, and the request reason may include at least one of the following: the second device detects a collision event, power of the second device is insufficient, or the second device is an assisted device. It may be understood that specific content of the request reason may alternatively be set based on an actual application scenario. This is not limited in this embodiment of this application.

That the second device detects the collision event may be understood as follows: If the on-board device detects, through a collision sensor, that impact force of a collision is greater than or equal to a first threshold, the on-board device detects the collision event. A specific value of the first threshold may be set based on an actual application scenario. This is not limited in this embodiment of this application.

That the power of the second device is insufficient may be understood as follows: The power of the on-board device is less than a second threshold. A specific value of the second threshold may be set based on an actual application scenario. This is not limited in this embodiment of this application.

That the second device is the assisted device may be understood as follows: The on-board device has an exception, and the on-board device may implement an emergency call with assistance of another device. In this case, the on-board device is the assisted device, and the another device is an assisting device. The exception may include a case such as a case in which the power of the on-board device is insufficient. It may be understood that specific content of the exception may alternatively be set based on an actual application scenario. This is not limited in this embodiment of this application.

In this embodiment of this application, a possible implementation in which the on-board device sends the connection establishment request to the portable terminal device is as follows: The second device automatically triggers sending of the connection establishment request based on a preset condition.

For example, when the preset condition is that the on-board device fails to call the PSAP, the on-board device may automatically trigger sending of the connection establishment request. It may be understood that a specific implementation in which the on-board device sends the connection establishment request to the portable terminal device is not limited in this embodiment of this application.

It should be noted that specific content of the preset condition may be the same as at least one of the request reasons, and the specific content of the preset condition may alternatively be set based on an actual application scenario. This is not limited in this embodiment of this application.

In this embodiment of this application, a possible implementation in which the on-board device sends the connection establishment request to the portable terminal device is as follows: The on-board device sends the connection establishment request to the portable terminal device in a manner such as Bluetooth, SparkLink, a vehicle-to-everything wireless communication technology (vehicle-to-everything, V2X), or wireless fidelity (Wi-Fi).

For example, when the portable terminal device and the on-board device enable Bluetooth, the on-board device searches for a device within a second range. After the portable terminal device is found, a PIN related to the portable terminal device is input on the on-board device. When the PIN is correctly input, the on-board device may send the connection establishment request to the portable terminal device. The second range may be a range of 30 meters around the on-board device. It may be understood that specific content of the second range may alternatively be set based on an actual application scenario. This is not limited in this embodiment of this application. A specific implementation in which the on-board device sends the connection establishment request to the portable terminal device through Bluetooth is not limited in this embodiment of this application.

S502: The portable terminal device authenticates an identity of the on-board device based on the connection establishment request and first subscription information.

In this embodiment of this application, the first subscription information indicates at least one assisted device allowing the portable terminal device to assist in calling the PSAP, and the like. It may be understood that specific content of the first subscription information may alternatively be set based on an actual application scenario. This is not limited in this embodiment of this application.

In this embodiment of this application, the first subscription information further includes a condition under which the portable terminal device allows establishment of the short-range communication. Therefore, a possible implementation in which the portable terminal device authenticates the identity of the on-board device based on the connection establishment request and the first subscription information is as follows: When the request reason matches the condition and the at least one assisted device includes the on-board device, the identity of the on-board device is successfully authenticated.

For example, if the condition under which the portable terminal device allows establishment of the short-range communication includes at least one of the request reasons, and the at least one assisted device allowing the portable terminal device to assist in calling the PSAP includes the on-board device, it is determined that the request reason matches the condition and the at least one assisted device includes the on-board device, so that the identity of the on-board device is successfully authenticated.

S503: The portable terminal device establishes the short-range communication with the on-board device when the identity of the on-board device is successfully authenticated.

For example, when the identity of the on-board device is successfully authenticated, the portable terminal device may establish the short-range communication with the on-board device through Bluetooth. For an implementation in which the portable terminal device establishes the short-range communication with the on-board device through Bluetooth, refer to the corresponding content descriptions in S401. Details are not described herein again. It may be understood that an implementation in which the portable terminal device establishes the short-range communication with the on-board device may alternatively be set based on an actual application scenario. This is not limited in this embodiment of this application.

S504: The on-board device sends related information of the on-board device to the portable terminal device.

Correspondingly, the portable terminal device receives the related information of the on-board device from the on-board device.

S505: The portable terminal device sends the related information of the on-board device and related information of the portable terminal device to the PSAP.

Correspondingly, the PSAP receives the related information of the on-board device and the related information of the portable terminal device from the portable terminal device. For content of the related information of the on-board device and the related information of the portable terminal device, refer to the foregoing content descriptions. Details are not described herein again.

S506: The PSAP sends paging to the portable terminal device based on the related information of the on-board device and the related information of the portable terminal device.

In this embodiment of this application, a possible implementation in which the PSAP sends the paging to the portable terminal device based on the related information of the on-board device and the related information of the portable terminal device is as follows: The PSAP sends the paging to the portable terminal device when there is no response to paging sent by the PSAP to the on-board device.

For example, after the PSAP receives the information sent by the portable terminal device, the PSAP may establish a link connection to the on-board device to implement a voice call. When the on-board device cannot be connected due to a reason such as insufficient power or an exception, the PSAP sends the paging to the portable terminal device, to implement an emergency call.

S507: The portable terminal device automatically enables answering based on the paging.

In this embodiment of this application, the answering may be hands-free answering. In this way, when a user cannot use a voice call of the portable terminal device due to injury, the portable terminal device may automatically answer paging from the PSAP, to implement an emergency call in a hands-free manner, so that the PSAP may collect voice information based on the hands-free call, and learn of a situation around the portable terminal device, to improve rescue efficiency.

It should be noted that, after the portable terminal device sends the related information of the on-board device and the related information of the portable terminal device to the PSAP, the portable terminal device may alternatively automatically enable answering.

It should be noted that S501, S502, S504, and S507 in this embodiment of this application are optional steps. One or more optional steps may be set based on an actual application scenario. A sequence of the steps in this embodiment of this application may alternatively be adjusted based on an actual application scenario. This is not specifically limited in this embodiment of this application.

In conclusion, in this embodiment of this application, the portable terminal device receives the connection establishment request from the on-board device, and establishes, based on the connection establishment request and the first subscription information, the short-range communication with the on-board device when the identity of the on-board device is successfully authenticated, so that the on-board device may send the related information to the portable terminal device, and the portable terminal device may send the related information of the on-board device and the related information of the portable terminal device to the PSAP. In this way, the PSAP may send the paging to the portable terminal device based on the related information of the on-board device and the related information of the portable terminal device when there is no response to the paging sent by the PSAP to the on-board device. Because the portable terminal device automatically enables answering, the portable terminal device may automatically answer the paging from the PSAP, to implement the emergency call in the hands-free manner, and ensure that the emergency call is implemented through the portable terminal device when the power of the on-board device is insufficient.

Figure 6:
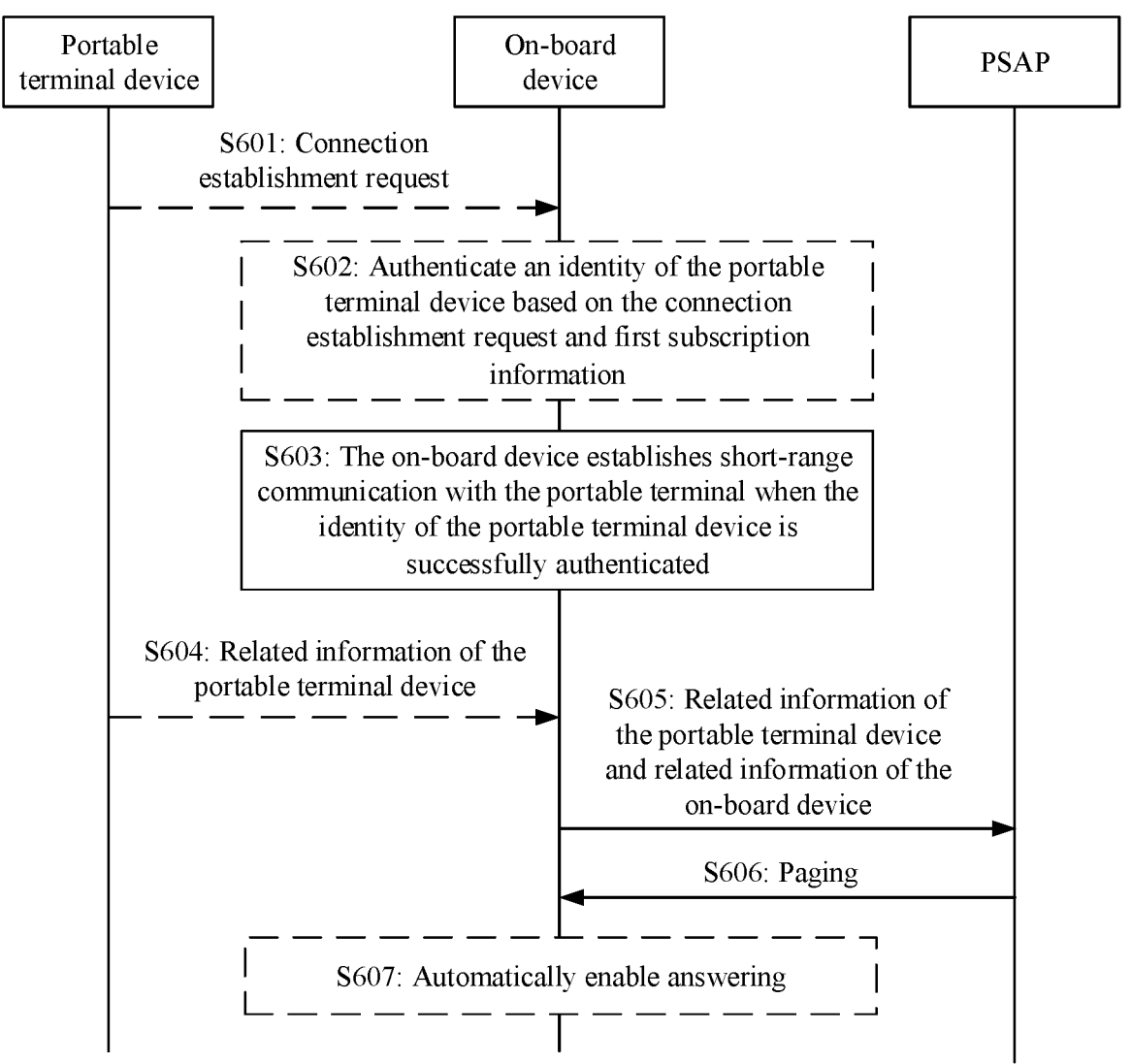
FIG. 6 is a schematic flowchart of a multi-device joint call method according to an embodiment of this application.

Based on the embodiment shown in FIG. 4, the foregoing scenario B is used as an example. For example, FIG. 6 is a schematic flowchart of a multi-device joint call method according to an embodiment of this application. In this embodiment of this application, a first device is an on-board device, a second device is a portable terminal device, and a third device is a PSAP. The on-board device may assist the portable terminal device in calling the PSAP, or it may be understood as that the portable terminal device may be assisted by the on-board device in calling the PSAP.

As shown in FIG. 6, the method may include the following steps.

S601: The portable terminal device sends a connection establishment request to the on-board device.

In this embodiment of this application, the connection establishment request includes a request reason, and the request reason may include at least one of the following: the second device detects a rescue event, power of the second device is insufficient, or the second device is an assisted device. It may be understood that specific content of the request reason may alternatively be set based on an actual application scenario. This is not limited in this embodiment of this application.

That the second device detects the rescue event may be understood as follows: If a user makes a call to an alarm platform through the portable terminal device, the portable terminal device detects the rescue event. It may be understood that a specific implementation in which the portable terminal device detects the rescue event is not limited in this embodiment of this application.

That the power of the second device is insufficient may be understood as follows: The power of the portable terminal device of the user is less than a third threshold. A specific value of the third threshold may be set based on an actual application scenario. This is not limited in this embodiment of this application.

That the second device is the assisted device may be understood as follows: The portable terminal device has an exception, and the portable terminal device may implement an emergency call with assistance of another device. In this case, the portable terminal device is the assisted device, and the another device is an assisting device. The exception may include a case such as a case in which the power of the portable terminal device is insufficient. It may be understood that specific content of the exception may alternatively be set based on an actual application scenario. This is not limited in this embodiment of this application.

It should be noted that, when a user who takes a hitch ride makes a call to the alarm platform through the portable terminal device, and the call is hung up and location information of the portable terminal device remains unchanged, because the portable terminal device detects the rescue event, the portable terminal device may implement an emergency call through an on-board device in the hitch ride.

In this embodiment of this application, for an implementation in which the portable terminal device sends the connection establishment request to the on-board device, refer to the corresponding content descriptions in S501. Details are not described herein again. It may be understood that an implementation in which the portable terminal device sends the connection establishment request to the on-board device may alternatively be set based on an actual application scenario. This is not limited in this embodiment of this application.

S602: The on-board device authenticates an identity of the portable terminal device based on the connection establishment request and first subscription information.

In this embodiment of this application, for S602, refer to the corresponding content descriptions in S502 corresponding to FIG. 5. Details are not described herein again.

It should be noted that, when the identity of the portable terminal device is authenticated, if the user takes a hitch ride, the identity of the portable terminal device of the user may be authenticated based on mobile phone information registered by the user when the user takes the hitch ride; or mobile phone information of a driver of the hitch ride may be used, where the mobile phone information includes location information and the like. Therefore, the identity of the portable terminal device is authenticated by searching for a device within a third range based on the location information. The third range may be a range of 15 meters around the location information. It may be understood that specific content of the third range may alternatively be set based on an actual application scenario. This is not limited in this embodiment of this application.

S603: The on-board device establishes short-range communication with the portable terminal device when the identity of the portable terminal device is successfully authenticated.

S604: The portable terminal device sends related information of the portable terminal device to the on-board device.

S605: The on-board device sends the related information of the portable terminal device and related information of the on-board device to the PSAP.

S606: The PSAP sends paging to the on-board device based on the related information of the portable terminal device and the related information of the on-board device.

S607: The on-board device automatically enables answering based on the paging.

In this embodiment of this application, for S603 to S607, refer to the corresponding content descriptions in S503 to S507 in the embodiment shown in FIG. 5. Details are not described herein again. A difference from the embodiment shown in FIG. 5 is that in the embodiment shown in FIG. 6, the first device is the on-board device, and the second device is the portable terminal device.

In conclusion, in this embodiment of this application, the on-board device receives the connection establishment request from the portable terminal device, and establishes, based on the connection establishment request and the first subscription information, the short-range communication with the portable terminal device when the identity of the portable terminal device is successfully authenticated, so that the portable terminal device may send the related information to the on-board device, and the on-board device may send the related information of the on-board device and the related information of the portable terminal device to the PSAP. In this way, the PSAP may send the paging to the on-board device based on the related information of the on-board device and the related information of the portable terminal device. Because the on-board device automatically enables answering, the on-board device may automatically answer the paging from the PSAP, to implement an emergency call in a hands-free manner, and ensure that the emergency call is implemented through the on-board device when the power of the portable terminal device is insufficient.

Figure 7:
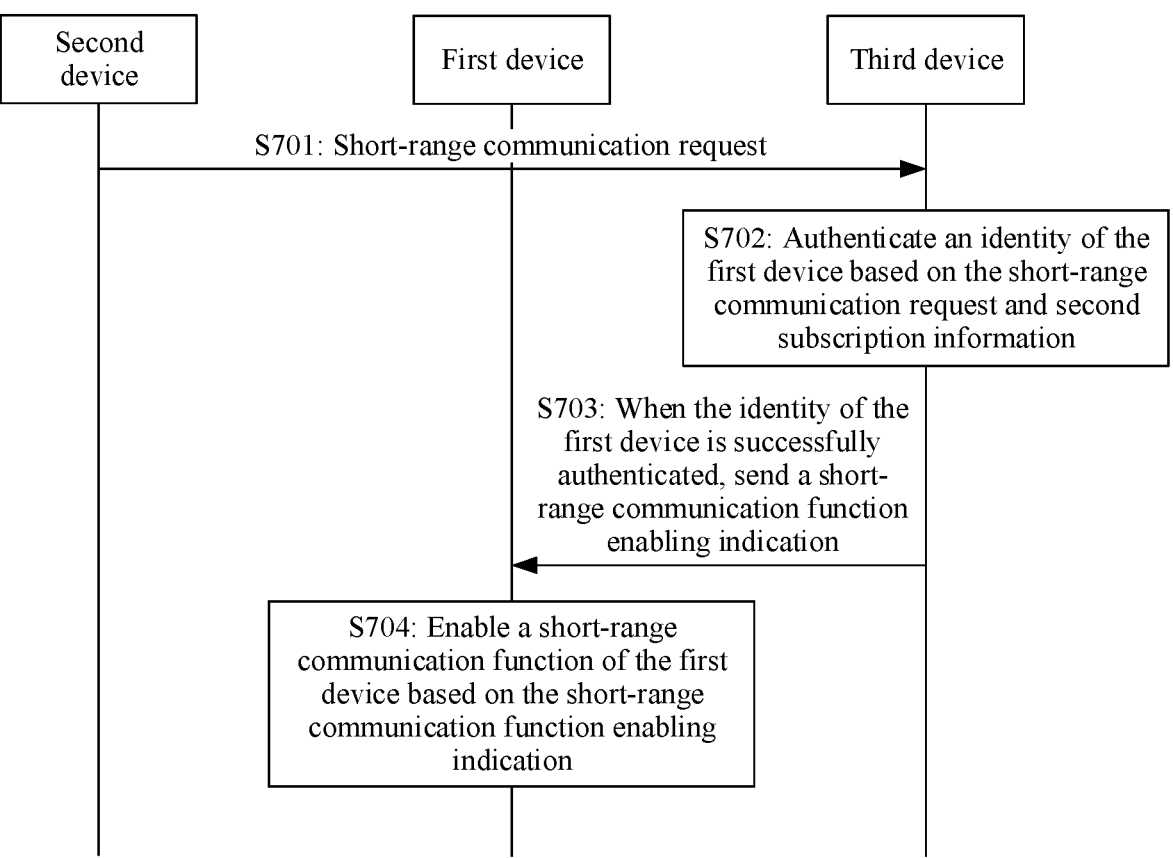
FIG. 7 is a schematic flowchart of a multi-device joint call method according to an embodiment of this application.

Based on the embodiments shown in FIG. 4 to FIG. 6, for example, FIG. 7 is a schematic flowchart of a multi-device joint call method according to an embodiment of this application. The method in this embodiment of this application may be performed before S401, S501, or S601. As shown in FIG. 7, the method may include the following steps.

S701: A second device sends a short-range communication request to a third device.

Correspondingly, the third device receives the short-range communication request from the second device, and the short-range communication request is used by the second device to request to establish short-range communication with a first device, so that the second device sends related information of the second device to the first device based on the established short-range communication. An implementation in which the second device sends the short-range communication request to the third device is not limited in this embodiment of this application.

For example, when the foregoing scenario A is used as an example, the second device is an on-board device, and the third device is a PSAP. In this case, S701 may be described as follows: The on-board device sends a short-range communication request to the PSAP. A specific implementation in which the on-board device sends the short-range communication request to the PSAP is not limited in this embodiment of this application.

When the foregoing scenario B is used as an example, the second device is a portable terminal device, and the third device is a PSAP. In this case, S701 may be described as follows: The portable terminal device sends a short-range communication request to the PSAP. A specific implementation in which the portable terminal device sends the short-range communication request to the PSAP is not limited in this embodiment of this application.

S702: The third device authenticates an identity of the first device based on the short-range communication request and second subscription information.

In this embodiment of this application, the second subscription information indicates at least one assisting device that is allowed to assist the second device in calling the third device. It may be understood that specific content of the second subscription information may alternatively be set based on an actual application scenario. This is not limited in this embodiment of this application.

In this embodiment of this application, a possible implementation in which the third device authenticates the identity of the first device based on the short-range communication request and the second subscription information is as follows: When the first device is the assisting device, the identity of the first device is successfully authenticated. For example, the second subscription information includes identity information of the first device, so that it is determined that the first device is the assisting device. In this case, the identity of the first device is successfully authenticated.

For example, when the foregoing scenario A is used as an example, the first device is a portable terminal device, and the third device is the PSAP. In this case, S702 may be described as follows: The PSAP authenticates an identity of the portable terminal device based on the short-range communication request and second subscription information. For an implementation in which the PSAP authenticates the identity of the portable terminal device based on the short-range communication request and the second subscription information, refer to the foregoing corresponding content descriptions, or the implementation may be set based on an actual application scenario. This is not limited in this embodiment of this application.

When the foregoing scenario B is used as an example, the first device is an on-board device, and the third device is the PSAP. In this case, S702 may be described as follows: The PSAP authenticates an identity of the on-board device based on the short-range communication request and second subscription information. For an implementation in which the PSAP authenticates the identity of the on-board device based on the short-range communication request and the second subscription information, refer to the foregoing corresponding content descriptions, or the implementation may be set based on an actual application scenario. This is not limited in this embodiment of this application.

S703: When the identity of the first device is successfully authenticated, the third device sends a short-range communication function enabling indication to the first device.

Correspondingly, the first device receives the short-range communication function enabling indication from the third device, where the short-range communication function enabling indication indicates the first device to enable a short-range communication function, so that the second device may establish short-range communication with the first device. A specific implementation in which the third device sends the short-range communication function enabling indication to the first device is not limited in this embodiment of this application.

For example, when the foregoing scenario A is used as an example, the first device is the portable terminal device, and the third device is the PSAP. In this case, S703 may be described as follows: When the identity of the portable terminal device is successfully authenticated, the PSAP sends a short-range communication function enabling indication to the portable terminal device. A specific implementation in which the PSAP sends the short-range communication function enabling indication to the portable terminal device is not limited in this embodiment of this application.

When the foregoing scenario B is used as an example, the first device is the on-board device, and the third device is the PSAP. In this case, S703 may be described as follows: When the identity of the on-board device is successfully authenticated, the PSAP sends a short-range communication function enabling indication to the on-board device. A specific implementation in which the PSAP sends the short-range communication function enabling indication to the on-board device is not limited in this embodiment of this application.

S704: The first device enables the short-range communication function of the first device based on the short-range communication function enabling indication.

In this embodiment of this application, after the first device enables the short-range communication, the second device may send related information of the first device to the first device, and the second device sends the related information of the first device and the related information of the first device to the third device, so that the third device sends paging to the first device by parsing the related information of the second device and the related information of the first device.

For example, when the foregoing scenario A is used as an example, the first device is the portable terminal device. In this case, S704 may be described as follows: The portable terminal device enables the short-range communication function of the portable terminal device based on the short-range communication function enabling indication. A specific implementation in which the portable terminal device enables the short-range communication function of the portable terminal device is not limited in this embodiment of this application.

When the foregoing scenario B is used as an example, the first device is the on-board device. In this case, S704 may be described as follows: The on-board device enables the short-range communication function of the on-board device based on the short-range communication function enabling indication. A specific implementation in which the on-board device enables the short-range communication function of the on-board device is not limited in this embodiment of this application.

In conclusion, in this embodiment of this application, the third device receives the short-range communication request from the second device, and sends the short-range communication function enabling indication to the first device based on the short-range communication request and the second subscription information when the identity of the first device is successfully authenticated, so that the first device may enable the short-range communication function of the first device based on the short-range communication function enabling indication, and the second device may establish the short-range communication with the first device and send the related information based on the short-range communication, to improve rescue efficiency.

The foregoing describes the methods in embodiments of this application with reference to FIG. 4 to FIG. 7. The following describes a multi-device joint call apparatus that is provided in embodiments of this application and that performs the foregoing methods. A person skilled in the art may understand that the method and the apparatus may be combined and referenced with each other. A multi-device joint call apparatus provided in embodiments of this application may perform steps of the first device in the multi-device joint call methods. Another multi-device joint call apparatus may perform steps performed by the second device in the multi-device joint call methods in the foregoing embodiments. Still another multi-device joint call apparatus may perform steps performed by the third device in the multi-device joint call methods in the foregoing embodiments.

An example in which each functional module is obtained through division based on each corresponding function is used below for description.

Figure 8:
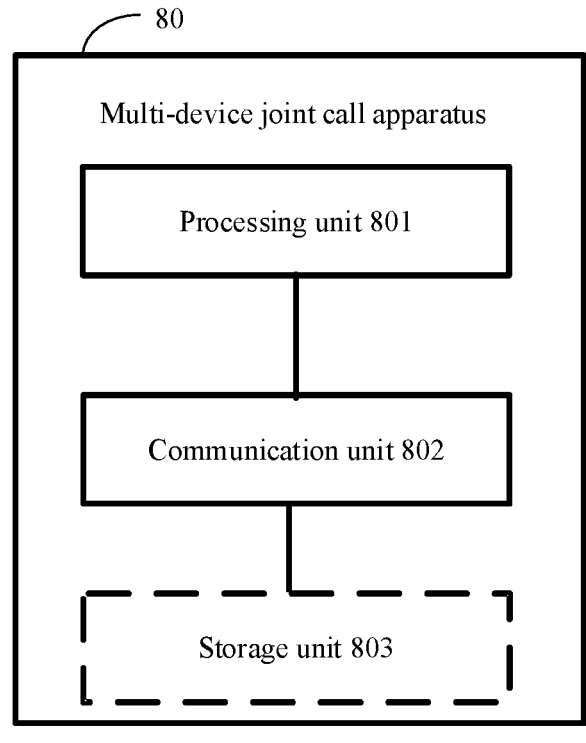
FIG. 8 is a schematic diagram of a structure of a multi-device joint call apparatus according to an embodiment of this application.

For example, FIG. 8 is a schematic diagram of a structure of a multi-device joint call apparatus according to an embodiment of this application. The multi-device joint call apparatus 80 may be a first device, a second device, or a third device in embodiments of this application, or may be a component, a chip, or a chip system used for the first device, the second device, or the third device.

As shown in FIG. 8, the multi-device joint call apparatus 80 includes a processing unit 801 and a communication unit 802. The communication unit 802 is configured to support the multi-device joint call apparatus in performing a step of sending or receiving information, and the processing unit 801 is configured to support the multi-device joint call apparatus in performing a step of processing information.

For example, a multi-device joint call apparatus used for a first device is used as an example. The processing unit is configured to establish short-range communication with a second device. The communication unit is configured to obtain related information of the second device based on the short-range communication. The communication unit is configured to send the related information of the second device and related information of the first device to a third device. The communication unit is configured to receive paging from the third device, where the paging is sent by the third device based on the related information of the second device and the related information of the first device.

In a possible implementation, the communication unit is specifically configured to receive a connection establishment request from the second device. The processing unit is specifically configured to authenticate an identity of the second device based on the connection establishment request and first subscription information, where the first subscription information indicates at least one assisted device allowing the first device to assist in calling the third device. The processing unit is specifically configured to establish the short-range communication with the second device when the identity of the second device is successfully authenticated.

In a possible implementation, the connection establishment request includes a request reason, and the first subscription information further includes a condition under which the first device allows establishment of the short-range communication. The processing unit is specifically configured to: when the request reason matches the condition and the at least one assisted device includes the second device, successfully authenticate the identity of the second device.

In a possible implementation, the request reason includes at least one of the following: the second device detects a collision event, the second device detects a rescue event, power of the second device is insufficient, or the second device is the assisted device.

In a possible implementation, the paging is paging for a voice call, and the processing unit is specifically configured to automatically enable answering based on the paging.

In a possible implementation, the answering is hands-free answering.

In a possible implementation, the communication unit is further configured to receive a short-range communication function enabling indication from the third device; and the processing unit is further configured to enable a short-range communication function of the first device based on the short-range communication function enabling indication.

In a possible implementation, the related information of the first device includes one or more of the following: location information of the first device, time stamp information related to the first device, contact information of the first device, an identification number of the first device, or track information of the first device; or the related information of the second device includes one or more of the following: location information of the second device, time stamp information related to the second device, contact information of the second device, an identification number of the second device, track information of the second device, or a reason why the second device is assisted in calling the third device.

For example, a multi-device joint call apparatus used for a third device is used as an example. The communication unit may be understood as a receiving unit and a sending unit. The receiving unit is configured to receive a paging request message from a first device, where the paging request message includes related information of the first device and related information of a second device; and the sending unit is configured to send paging to the first device based on the paging request message.

In a possible implementation, the sending unit is specifically configured to send the paging to the first device when there is no response to paging sent by the sending unit to the second device.

In a possible implementation, the receiving unit is further configured to receive a short-range communication request from the second device. The processing unit is configured to authenticate an identity of the first device based on the short-range communication request and second subscription information, where the second subscription information indicates at least one assisting device that is allowed to assist the second device in calling the third device. The sending unit is specifically configured to: when the identity of the first device is successfully authenticated, send a short-range communication function enabling indication to the first device.

In a possible implementation, the processing unit is specifically configured to: when the first device is the assisting device, successfully authenticate the identity of the first device.

In a possible implementation, the related information of the first device includes one or more of the following: location information of the first device, time stamp information related to the first device, contact information of the first device, an identification number of the first device, or track information of the first device; or the related information of the second device includes one or more of the following: location information of the second device, time stamp information related to the second device, contact information of the second device, an identification number of the second device, track information of the second device, or a reason why the second device is assisted in calling the third device.

In a possible implementation, the paging is paging for a voice call.

For example, a multi-device joint call apparatus used for a second device is used as an example. The communication unit is configured to send a connection establishment request to a first device. The processing unit is configured to establish short-range communication with the first device based on the connection establishment request. The communication unit is configured to send related information of the second device to the first device based on the short-range communication.

The connection establishment request includes a request reason, and the request reason includes at least one of the following: the second device detects a collision event, the second device detects a rescue event, power of the second device is insufficient, or the second device is an assisted device.

In a possible implementation, the communication unit is further configured to send a short-range communication request to a third device.

In a possible implementation, the related information of the second device includes one or more of the following: location information of the second device, time stamp information related to the second device, contact information of the second device, an identification number of the second device, track information of the second device, or a reason why the second device is assisted in calling the third device.

In a possible implementation, the communication unit is specifically configured to automatically trigger, based on a preset condition, sending of the connection establishment request.

In a possible embodiment, the multi-device joint call apparatus may further include a storage unit 803. The processing unit 801, the communication unit 802, and the storage unit 803 are connected through a communication bus.

The storage unit 803 may include one or more memories. The memory may be a component that is configured to store a program or data and that is in one or more devices or circuits.

The storage unit 803 may exist independently, and is connected to the processing unit 801 of the multi-device joint call apparatus through the communication bus. The storage unit 803 may alternatively be integrated with the processing unit 801.

The multi-device joint call apparatus may be used in a multi-device joint call device, a circuit, a hardware component, or a chip.

For example, the multi-device joint call apparatus may be a component, a chip, or a chip system of the first device, the second device, or the third device in this embodiment of this application. In this case, the communication unit 802 may be an input or output interface, a pin, a circuit, or the like. The storage unit 803 may store computer-executable instructions of a method on a side of the first device, the second device, or the third device, so that the processing unit 801 performs the method on the side of the first device, the second device, or the third device in the foregoing embodiments.

An embodiment of this application provides a multi-device joint call apparatus. The multi-device joint call apparatus includes one or more modules, configured to implement the methods in the steps included in FIG. 4 to FIG. 7. The one or more modules may correspond to the steps in the methods in the steps included in FIG. 4 to FIG. 7.

Specifically, in this embodiment of this application, for each step in the method performed by the first device, the first device includes a unit or a module for performing each step in the method. For each step in the method performed by the second device, the second device includes a unit or a module for performing each step in the method. For each step in the method performed by the third device, the third device includes a unit or a module for performing each step in the method. For example, a module that performs control or processing on an action of the multi-device joint call apparatus may be referred to as a processing module, and a module that performs a step of performing message or data processing on a side of the multi-device joint call apparatus may be referred to as a communication module.

Figure 9:
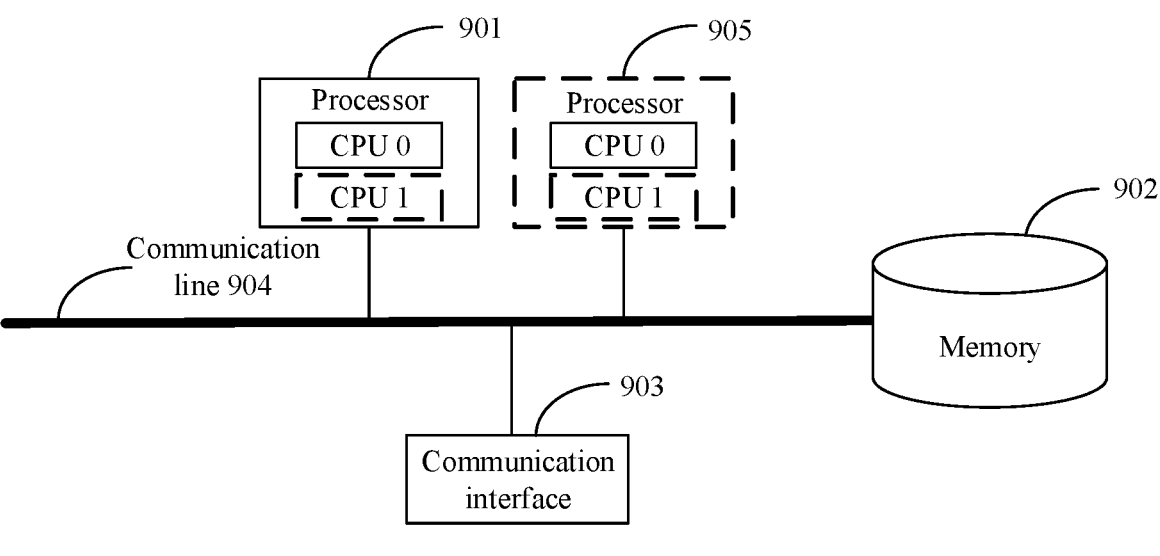
FIG. 9 is a schematic diagram of a hardware structure of a multi-device joint call device according to an embodiment of this application.

For example, FIG. 9 is a schematic diagram of a hardware structure of a multi-device joint call device according to an embodiment of this application. As shown in FIG. 9, the multi-device joint call device includes a processor 901, a communication line 904, and at least one communication interface (in FIG. 9, a communication interface 903 is used as an example for description).

The processor 901 may be an integrated circuit chip and has a signal processing capability. In an implementation process, the steps in the foregoing methods may be implemented by using a hardware integrated logic circuit in the processor 1501 or by using instructions in a form of software. The processor 1501 may be one or more of a general-purpose processor, a digital signal processor (DSP), an application specific integrated circuit (ASIC), a field-programmable gate array (FPGA), another programmable logic device, or a coprocessor. The processor may implement or perform the methods and steps that are disclosed in embodiments of this application. The general-purpose processor may be a microprocessor, or the processor may be any conventional processor or the like.

The communication line 904 may include a circuit for transmitting information between the foregoing components.

The communication interface 903 is any apparatus such as a transceiver, and configured to communicate with another device or a communication network such as the Ethernet or a wireless local area network (WLAN).

In this embodiment of this application, the processor 901 may be configured to perform the steps performed by the first device, the second device, or the third device in the foregoing method embodiments.

For example, the processor 901 is used for the first device, and is configured to perform S401 and S403; or the processor 901 is configured to perform S502, S503, S505, and S507; or the processor 901 is configured to perform S602, S603, S605, and S607; or the processor 901 is configured to perform S704, or another process that may be performed by the first device described in embodiments of this application.

For example, the processor 901 is used for the second device, and is configured to perform S402; or the processor 901 is configured to perform S501 and S504; or the processor 901 is configured to perform S601 and S604; or the processor 901 is configured to perform S701, or another process that may be performed by the second device described in embodiments of this application.

For example, the processor 901 is used for the third device, and is configured to perform S404; or the processor 901 is configured to perform S506; or the processor 901 is configured to perform S606; or the processor 901 is configured to perform S702 and S703, or another process that may be performed by the third device described in embodiments of this application.

Optionally, the multi-device joint call device may further include a memory 902.

The memory 902 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor through the communication line 904, or the memory may be integrated with the processor.

The memory 902 is configured to store computer-executable instructions for executing the solutions in this application, and the processor 901 controls the execution. The processor 901 is configured to execute the computer-executable instructions stored in the memory 902, to implement the multi-device joint call method provided in embodiments of this application.

Optionally, the computer-executable instructions in this embodiment of this application may also be referred to as application program code. This is not specifically limited in this embodiment of this application.

During specific implementation, in an embodiment, the processor 901 may include one or more CPUs, for example, a CPU 0 and a CPU 1 in FIG. 9.

During specific implementation, in an embodiment, the multi-device joint call device may include a plurality of processors, for example, the processor 901 and a processor 905 in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

Figure 10:
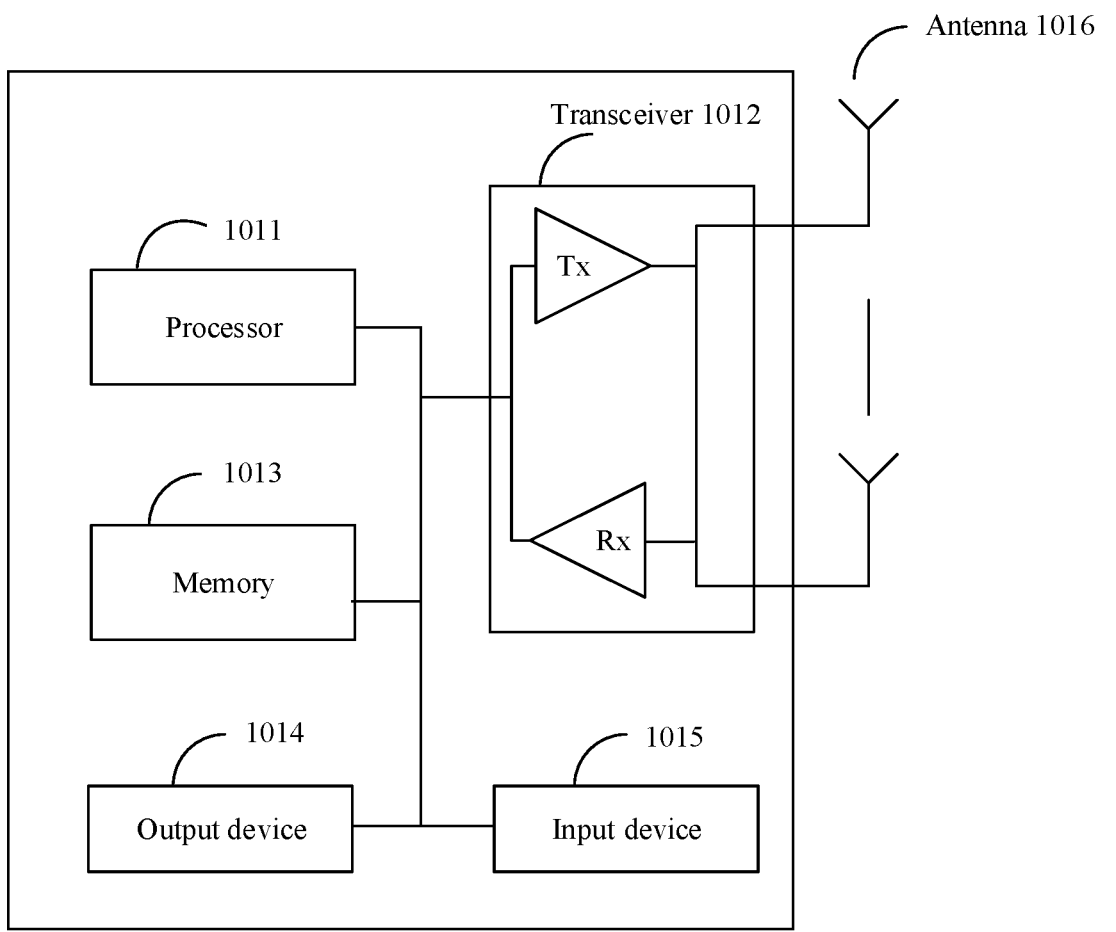
FIG. 10 is a schematic diagram of a structure of a portable terminal device according to an embodiment of this application.

For example, FIG. 10 is a schematic diagram of a structure of a portable terminal device (a terminal for short below) according to an embodiment of this application. As shown in FIG. 10, the terminal includes at least one processor 1011 and at least one transceiver 1012. In a possible example, the terminal may further include at least one memory 1013, an output device 1014, an input device 1015, and one or more antennas 1016. The processor 1011, the memory 1013, and the transceiver 1012 are connected. The antenna 1016 is connected to the transceiver 1012, and the output device 1014 and the input device 1015 are connected to the processor 1011.

A memory in this embodiment of this application, for example, the memory 1013, may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM).

In a possible example, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer, but is not limited thereto.

The memory 1013 may exist independently, and is connected to the processor 1011. In another example, the memory 1013 may be integrated with the processor 1011, for example, be integrated into a chip. The memory 1013 can store program code for executing the technical solutions in embodiments of this application, and the processor 1011 controls the execution. Various types of computer program code that are executed may also be considered as drivers of the processor 1011. For example, the processor 1011 is configured to execute computer program code stored in the memory 1013, to implement the technical solutions in embodiments of this application.

The transceiver 1012 may be configured to support receiving or sending of a radio frequency signal between the terminal and an on-board device or between the terminal and a third device. The transceiver 1012 may be connected to the antenna 1016. The transceiver 1012 includes a transmitter Tx and a receiver Rx. Specifically, One or more antennas 1016 may receive radio frequency signals. The receiver Rx of the transceiver 1012 is configured to: receive the radio frequency signal from the antenna, convert the radio frequency signal into a digital baseband signal or a digital intermediate frequency signal, and provide the digital baseband signal or the digital intermediate frequency signal to the processor 1011, so that the processor 1011 performs further processing, for example, demodulation processing and decoding processing, on the digital baseband signal or the digital intermediate frequency signal. In addition, the transmitter Tx of the transceiver 1012 is further configured to: receive a modulated digital baseband signal or a modulated digital intermediate frequency signal from the processor 1011, convert the modulated digital baseband signal or the modulated digital intermediate frequency signal into a radio frequency signal, and send the radio frequency signal through the one or more antennas 1016. Specifically, the receiver Rx may selectively perform one-level or multi-level down-conversion mixing and analog-to-digital conversion on the radio frequency signal, to obtain the digital baseband signal or the digital intermediate frequency signal. A sequence of the down-conversion mixing and the analog-to-digital conversion may be adjusted. The transmitter Tx may selectively perform one-level or multi-level up-conversion mixing and digital-to-analog conversion on the modulated digital baseband signal or the modulated digital intermediate frequency signal, to obtain the radio frequency signal. A sequence of the up-conversion mixing and the digital-to-analog conversion may be adjusted. The digital baseband signal and the digital intermediate frequency signal may be collectively referred to as a digital signal.

The processor 1011 may be a baseband processor, or may be a CPU. The baseband processor and the CPU may be integrated or separated.

The processor 1011 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1011 is configured to implement one or more of the foregoing functions.

With reference to the multi-device joint call method described in the foregoing embodiments, when the first device is a portable terminal device, the processor 1011 may perform the steps performed by the first device in the foregoing method embodiments. When the second device is a portable terminal device, the processor 1011 may perform the steps performed by the second device in the foregoing method embodiments.

The output device 1014 communicates with the processor 1011, and may display information in a plurality of manners. For example, the output device 1014 may be a liquid crystal display (LCD), a light emitting diode (LED) display device, a cathode ray tube (CRT) display device, or a projector. The input device 1015 communicates with the processor 1011, and may receive an input of a user in a plurality of manners. For example, the input device 1015 may be a mouse, a keyboard, a touchscreen device, or a sensing device.

Figure 11:
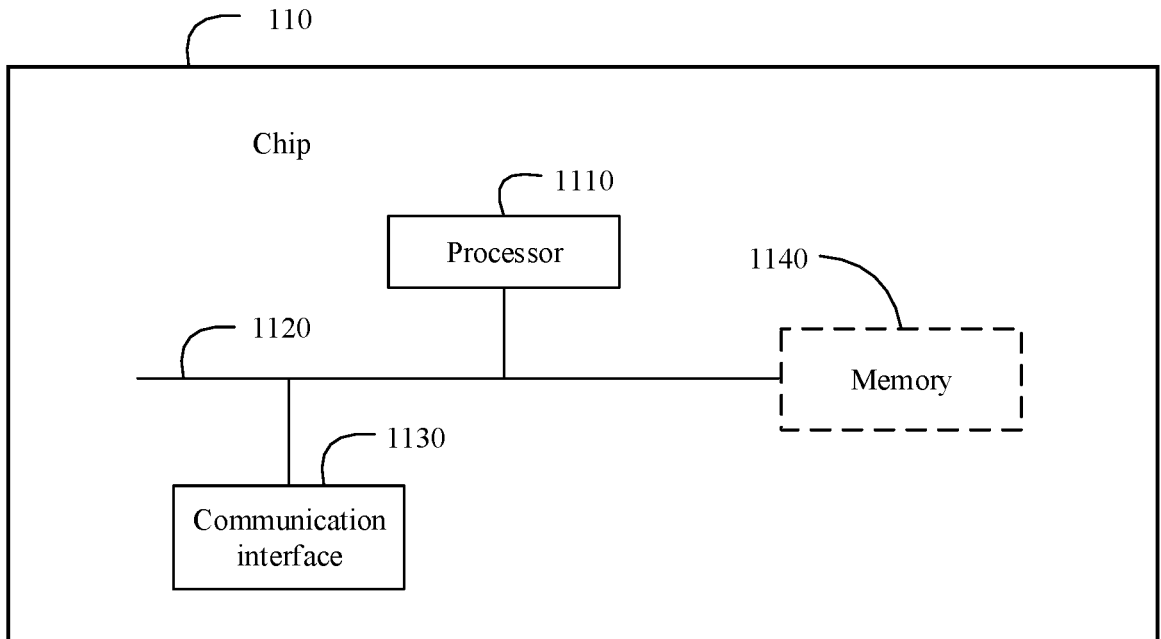
FIG. 11 is a schematic diagram of a structure of a chip according to an embodiment of this application.

For example, FIG. 11 is a schematic diagram of a structure of a chip according to an embodiment of this application. The chip 110 includes one or more (including two) processors 1110 and a communication interface 1130.

In some implementations, a memory 1140 stores the following elements: an executable module or a data structure, a subset thereof, or an extended set thereof.

In this embodiment of this application, the memory 1140 may include a read-only memory and a random access memory, and provide instructions and data for the processor 1110. A part of the memory 1140 may further include a non-volatile random access memory (NVRAM).

In this embodiment of this application, the processor 1110 may control, by invoking operation instructions stored in the memory 1140 (where the operation instructions may be stored in an operating system), the first device, the second device, or the third device to perform a corresponding operation. The processor 1110 may be referred to as a central processing unit (CPU).

In this embodiment of this application, the memory 1140, the communication interface 1130, and the memory 1140 are coupled together through a bus system 1120. In addition to a data bus, the bus system 1120 may further include a power bus, a control bus, a status signal bus, and the like. For ease of description, various buses are marked as the bus system 1120 in FIG. 11.

The steps of the method disclosed with reference to embodiments of this application may be directly performed by a hardware decoding processor, or may be performed by using a combination of hardware in the decoding processor and a software module. The software module may be located in a mature storage medium in the art, such as a random access memory, a read-only memory, a programmable read-only memory, or an electrically erasable programmable read-only memory (EEPROM). The storage medium is located in the memory 1140, and the processor 1110 reads information in the memory 1140 and completes the steps of the foregoing method in combination with hardware of the processor 1110.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. For example, the usable medium may include a magnetic medium (for example, a floppy disk, a hard disk, or a magnetic tape), an optical medium (for example, a digital versatile disc (DVD)), a semiconductor medium (for example, a solid state disk (SSD)), or the like.

Embodiments of this application further provide a computer-readable storage medium. The methods described in the foregoing embodiments may be all or partially implemented by software, hardware, firmware, or any combination thereof. The computer-readable medium may include a computer storage medium and a communication medium, and may further include any medium that can transfer a computer program from one place to another place. The storage medium may be any target medium that can be accessed by a computer.

In a possible design, the computer-readable medium may include a compact disc read-only memory (CD-ROM), a RAM, a ROM, an EEPROM, or another optical disc memory. The computer-readable medium may include a magnetic disk memory or another magnetic disk storage device. In addition, any connection line may also be appropriately referred to as a computer-readable medium. For example, if a coaxial cable, an optical fiber cable, a twisted pair, a DSL, or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data by using laser light. The foregoing combinations also need to be included within the scope of the computer-readable medium.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first device comprising:

at least one processor; and at least one memory storing programming instructions for execution by the at least one processor to:

establish short-range communication with a second device;

obtain related information of the second device based on the short-range communication;

send the related information of the second device and related information of the first device to a third device; and receive paging from the third device, wherein the paging is sent by the third device based on the related information of the second device and the related information of the first device in response to determining that no response to paging is sent by the third device to the second device, and wherein the second device has insufficient power or is damaged such that the second device cannot support a call to the third device.

2. The first device according to claim 1, wherein the programming instructions are for execution by the at least one processor to:

receive a connection establishment request from the second device;

authenticate an identity of the second device based on the connection establishment request and first subscription information, wherein the first subscription information indicates at least one assisted device that allows the first device to assist in calling the third device; and establish the short-range communication with the second device in response to the identity of the second device being successfully authenticated.

3. The first device according to claim 2, wherein the connection establishment request comprises a request reason, the first subscription information further comprises a condition under which the first device allows establishment of the short-range communication, and the programming instructions are for execution by the at least one processor to:

in response to determining that the request reason matches the condition and the at least one assisted device comprises the second device, determining that the identity of the second device is successfully authenticated.

4. The first device according to claim 3, wherein the request reason comprises at least one of the following: the second device detects a collision event, the second device detects a rescue event, power of the second device is insufficient, or the second device is the assisted device.

5. The first device according to claim 1, wherein the paging is paging for a voice call, and the programming instructions are for execution by the at least one processor to:

automatically enable answering the voice call based on the paging.

6. The first device according to claim 1, wherein the programming information are for execution by the at least one processor to:

receive a short-range communication function enabling indication from the third device; and enable a short-range communication function of the first device based on the short-range communication function enabling indication.

7. The first device according to claim 1, wherein the related information of the first device comprises one or more of the following: location information of the first device, time stamp information related to the first device, contact information of the first device, an identification number of the first device, or track information of the first device; or the related information of the second device comprises one or more of the following: location information of the second device, time stamp information related to the second device, contact information of the second device, an identification number of the second device, track information of the second device, or a reason the second device is assisted in calling the third device.

8. A third device comprising:

at least one processor; and at least one memory storing programming instructions for execution by the at least one processor to:

receive a paging request message from a first device, wherein the paging request message comprises related information of the first device and related information of a second device; and send paging to the first device based on the paging request message in response to determining that no response to paging is sent by the third device to the second device.

9. The third device according to claim 8, wherein the programming instructions are for execution by the at least one processor to:

receive a short-range communication request from the second device;

authenticate an identity of the first device based on the short-range communication request and second subscription information, wherein the second subscription information indicates at least one assisting device allowed to assist the second device in calling the third device; and send a short-range communication function enabling indication to the first device in response to the identity of the first device being successfully authenticated.

10. The third device according to claim 9, wherein the programming instructions are for execution by the at least one processor to:

determining that the identity of the first device is successfully authenticated in response to determining that the first device is the assisting device.

11. The third device according to claim 8, wherein the related information of the first device comprises one or more of the following: location information of the first device, time stamp information related to the first device, contact information of the first device, an identification number of the first device, or track information of the first device; or the related information of the second device comprises one or more of the following: location information of the second device, time stamp information related to the second device, contact information of the second device, an identification number of the second device, track information of the second device, or a reason the second device is assisted in calling the third device.

12. The third device according to claim 8, wherein the paging is paging for a voice call.

13. A second device comprising:

at least one processor; and at least one memory storing programming instructions for execution by the at least one processor to:

detect at least one of a collision event, a rescue event, or insufficient power of the second device;

in response to detecting the at least one of the collision event, the rescue event, or the insufficient power, send a connection establishment request to a first device;

establish short-range communication with the first device based on the connection establishment request; and send, based on the short-range communication, related information of the second device to the first device, wherein the connection establishment request comprises a request reason, and the request reason comprises at least one of the following: the second device detects the collision event, the second device detects the rescue event, the insufficient power of the second device, or the second device is an assisted device.

14. The second device according to claim 13, wherein the programming instructions are for execution by the at least one processor to:

send, by the second device, a short-range communication request to a third device.

15. The second device according to claim 13, wherein the related information of the second device comprises one or more of the following: location information of the second device, time stamp information related to the second device, contact information of the second device, an identification number of the second device, track information of the second device, or a reason the second device is assisted in calling a third device.

16. The second device according to claim 13, wherein the programming instructions are for execution by the at least one processor to:

automatically trigger, based on a preset condition, the connection establishment request to be sent.

* * * * *